May 16, 1967  P. FREEDMAN ET AL  3,319,920
VEHICLE SEAT

Filed May 11, 1965  4 Sheets-Sheet 2

INVENTORS
PAUL FREEDMAN
ROBERT A. WAHLS
by: Morris Spector
ATTY.

INVENTORS
PAUL FREEDMAN
ROBERT A. WAHLS
by: Morris Spector
ATTY.

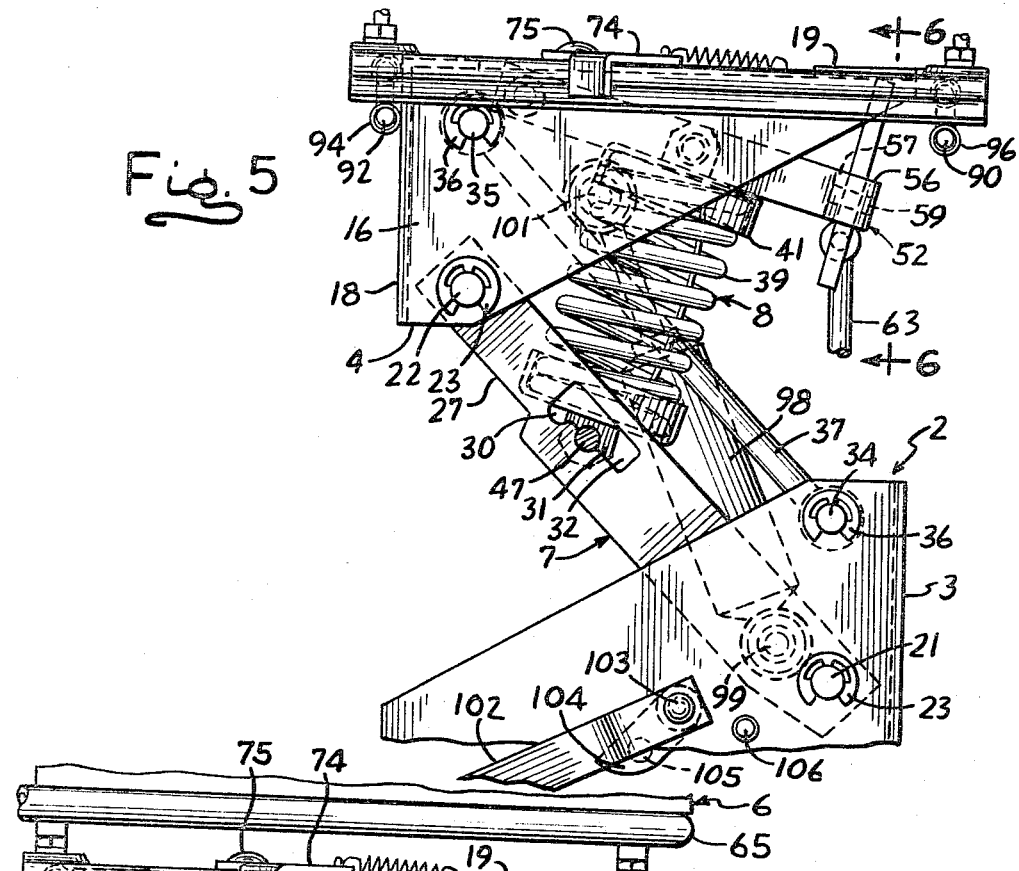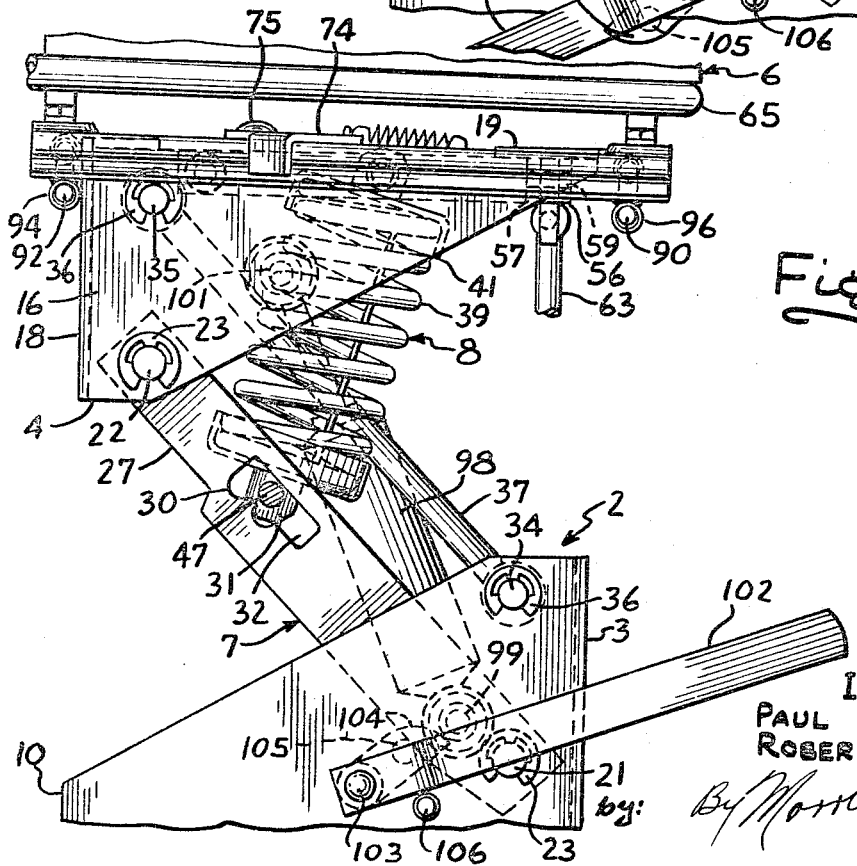

United States Patent Office 3,319,920
Patented May 16, 1967

3,319,920
VEHICLE SEAT
Paul Freedman, Chicago, and Robert A. Wahls, Des Plaines, Ill. (both of P.O. Box 1250, Evanston, Ill. 60204)
Filed May 11, 1965, Ser. No. 454,909
6 Claims. (Cl. 248—399)

This invention relates to vehicle seats, more particularly improvements in a driver's seat for a truck, bus or other automotive vehicle.

It is an object of the present invention to provide a vehicle seat suspension that supports a seat structure for fore and aft movement thereon in such a manner that relatively light shocks encountered while the vehicle is in motion are resisted, and the amount of resistance to the shocks increases with the intensity thereof. In accordance with this object of the invention, the seat structure is mounted on the suspension by cranks which are journaled on the seat structure and on the suspension so that the cranks freely rotate about their axes and the seat structure is carried by the crank arms forwardly and rearwardly in response to shocks in those directions, all while keeping the seat structure level. No springs or other damping devices are used to resist these shocks. The shocks on the seat structure are resisted substantially entirely by the weight of the seat structure and the load applied by the person on the seat. That combined weight tends to return the seat structure to its normal at rest position.

It is a further object of the present invention to provide a seat suspension which resiliently mounts the seat through a spring arrangement wherein the amount of deflection of the seat for a given load thereon can be adjusted by changing an effective lever arm that applies force to the spring to give the most comfortable riding qualities depending upon the weight of the person riding in the seat, and wherein accidental change in the adjusted condition is prevented.

It is another object of the present invention to provide a seat suspension in which the height of the seat can be adjusted in a novel and simple manner which eliminates the need for a pedestal or other relatively expensive height-adjusting mechanism.

The attainment of the above and further objects of the present invention will be apparent from the following specification taken in conjunction with the accompanying drawing forming a part thereof.

Figure 1:
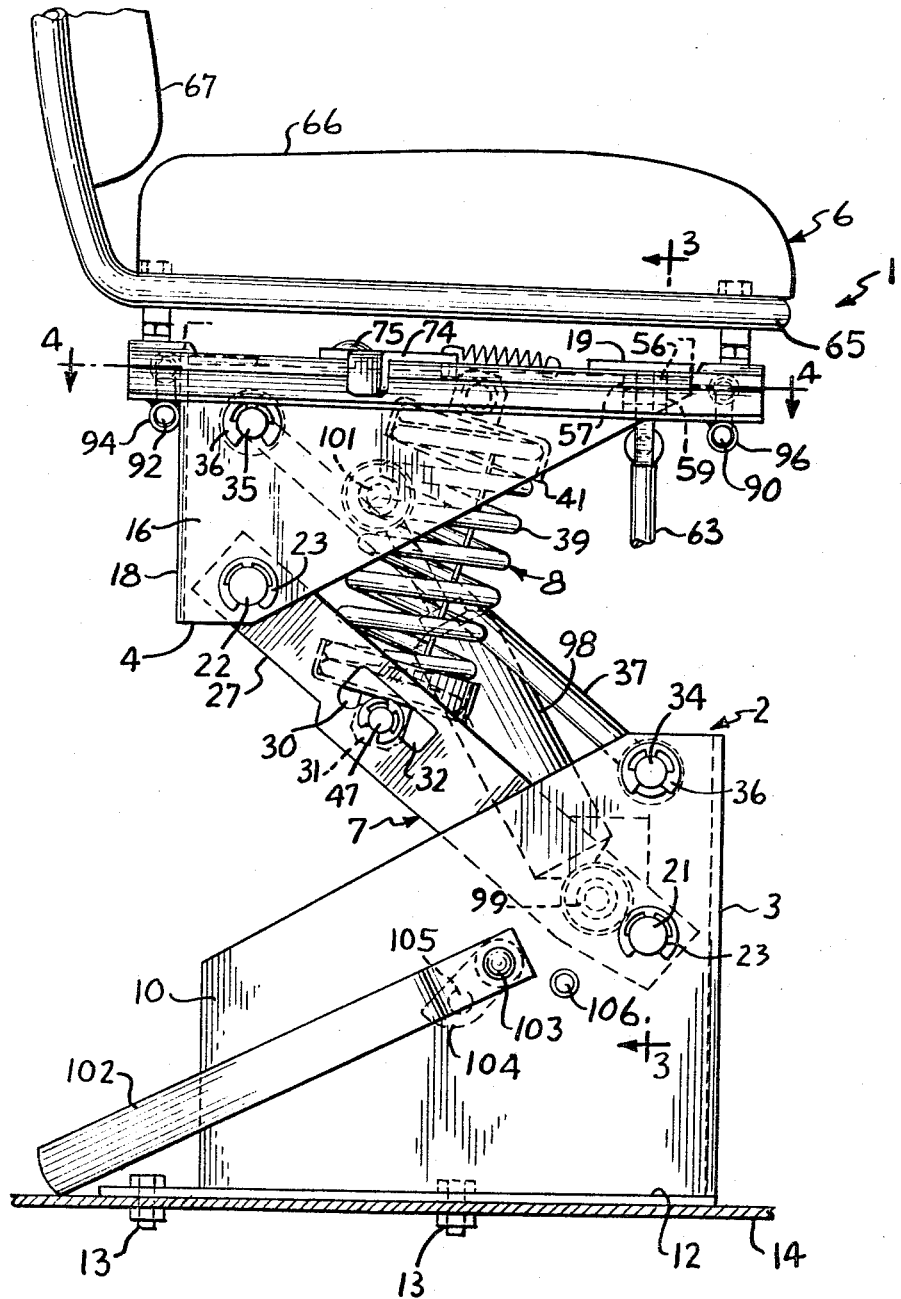
FIG. 1 is a side elevational view of a vehicle seat constructed in accordance with and embodying the present invention.
Figure 2:
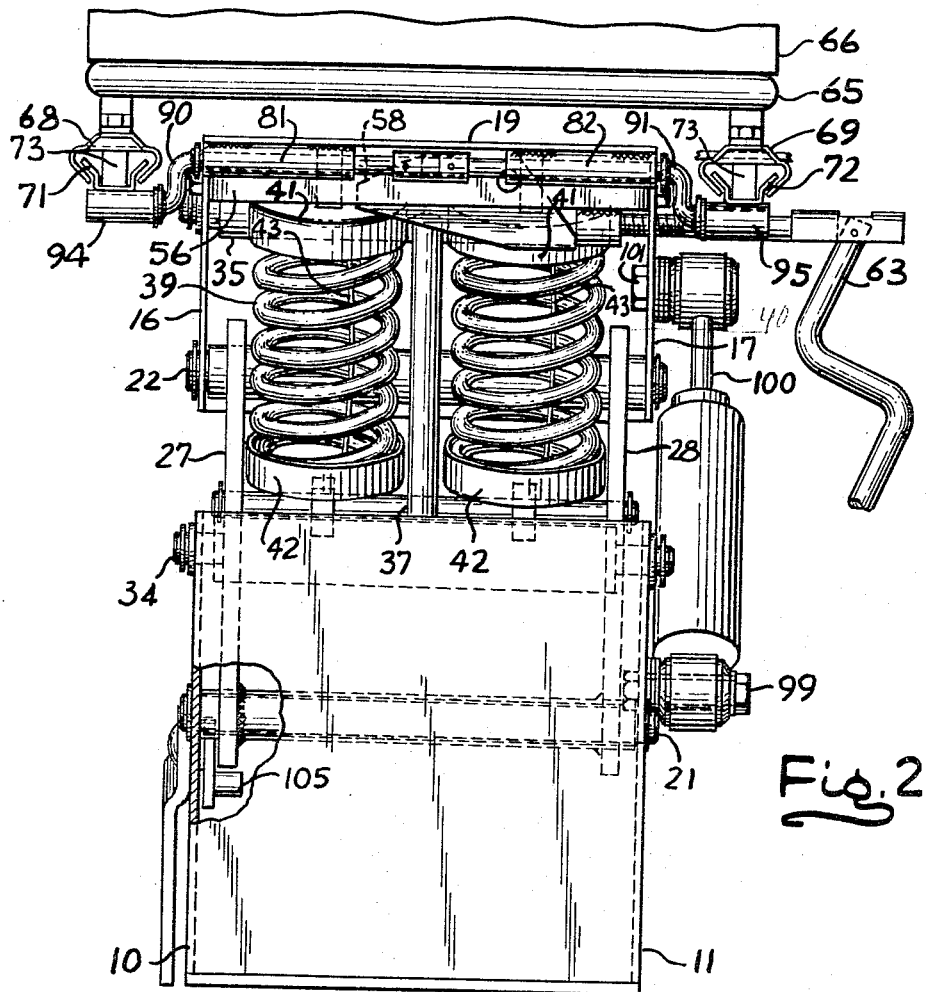
FIG. 2 is a front elevational view thereof.
Figure 6:
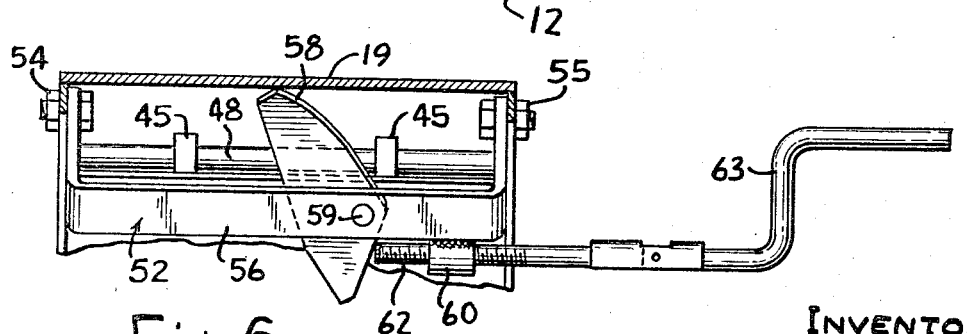
Figure 3:
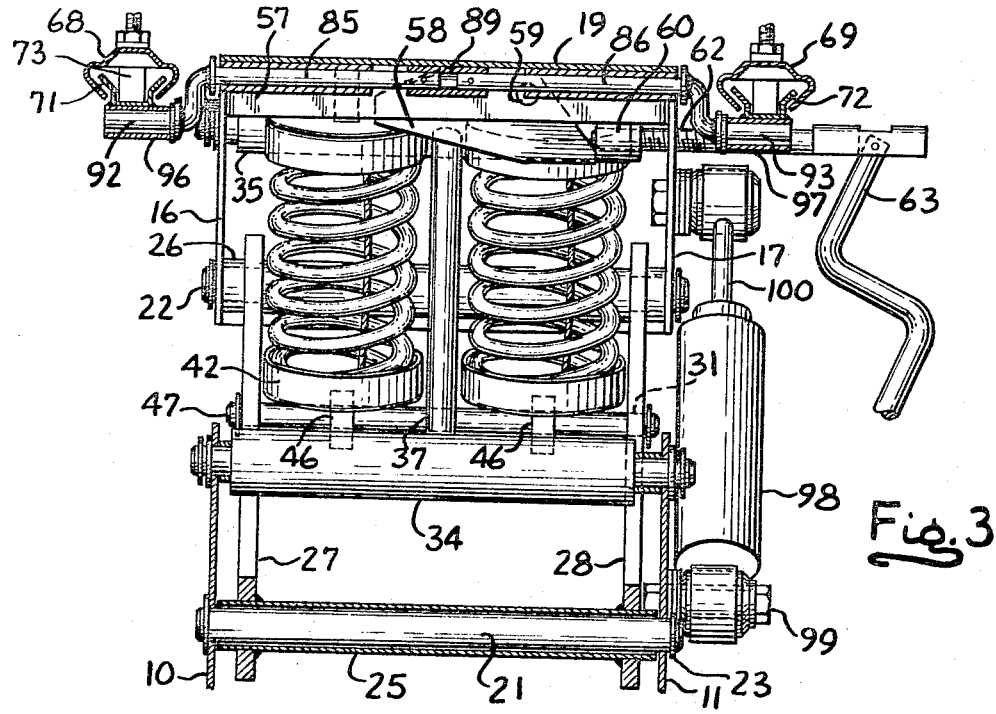
Figure 4:
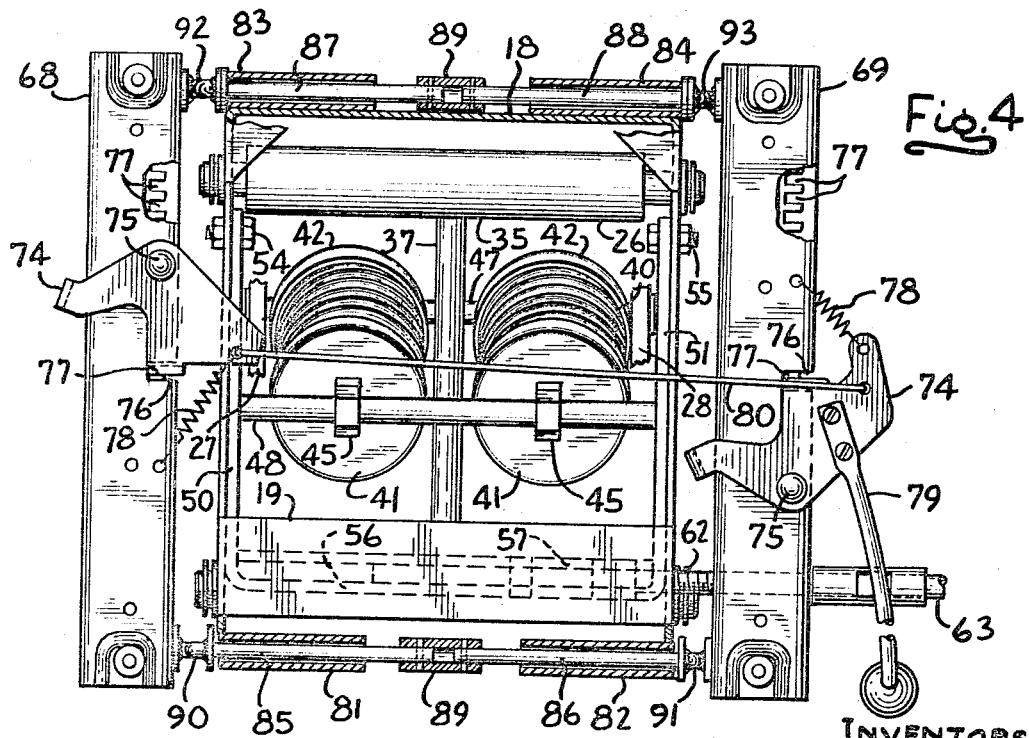

FIGS. 3 and 4 are fragmentary sectional views taken along lines 3—3 and 4—4, respectively, of FIG. 1;

FIG. 5 is a fragmentary side elevational view similar to FIG. 1 and showing the manner of adjusting the height of the seat structure;

FIG. 6 is a fragmentary sectional view taken along line 6—6 of FIG. 5; and

FIG. 7 is a fragmentary side elevational view similar to FIG. 5 and showing the manner of adjusting the effective spring lever arm to change the amount of deflection of the seat for a given load thereon.

Referring in more detail to the drawing, 1 designates a seat assembly which includes a seat suspension 2 having a base portion 3, a seat-supporting portion 4 upon which a seat structure 6 is mounted. A linkage generally designated at 7 joins the base portion 3 with the seat-supporting portion 4 and the linkage 7 whereby the linkage 7 and spring arrangement 8 supports the portion 4 and the seat structure 6 carried thereby for upward and downward arcuate movement on the base portion 3.

The base portion 3 comprises a frame having spaced sidewalls 10, 11 and a bottom plate 12. Bolts 13 may project through the bottom plate 12 to secure the base portion 3 to the floor or other suitable part 14 of the vehicle. The seat-supporting portion 4 comprises a frame with spaced parallel sidewalls 16, 17 which are joined by a back wall 18. A top plate 19 is rigidly secured to the upper edges of the sidewalls 16, 17 and extends forwardly thereof.

Mounted in and extending between the sidewalls 10, 11 is a pivot shaft 21, and similarly mounted in and extending between the sidewalls 16, 17 is a pivot shaft 22 which is parallel to the pivot shaft 21. Suitable means such as spring clips 23 may be used to retain the shafts 21, 22 in place. Pivoted on the shafts 21, 22 are sleeves 25, 26, and a pair of parallel arms 27, 28 are welded or otherwise rigidly secured at their respective ends to the sleeves 25, 26, the arms 27, 28 being adjacent to the sidewalls 10, 11, 16, 17. As best seen in FIGS. 1, 5 and 7 the arm 27 has notches 30, 31, 32 intermediate its ends. The arm 28 has an identical set of notches. Rotatably mounted on the sidewalls 10, 11 is a rod 34, and a similar rod 35 which parallel to the rod 34 is rotatably mounted on the sidewalls 16, 17. Spring clips 36 retain the rods 34, 35 against axial retraction from the portions 3, 4. A bar 37 is welded or otherwise rigidly joins the rods 34, 35, being secured to each approximately midway between their ends, thereby cooperating with the arms 27, 28 to form the parallelogram linkage 7.

The spring arrangement 8 includes a pair of parallel coil compression springs 39, 40, one on either side of the bar 37. The ends of the springs 39, 40 are seated in cups 41, 42 and a wire 43 is secured to each pair of cups 41, 42 and extends through the associated spring to limit the amount of axial expansion of springs 39, 40. Pivot blocks 45, 46 are rigidly secured to the upper and lower cups 41, 42 of each spring 39, 40. The lower pivot blocks 46 are journaled on a lower cross rod 47 which is adapted to seat selectively in any pair of corresponding notches 30, 31, 32 in the arms 27, 28. The upper pivot blocks 45 are journaled on an upper cross rod 48 which is, in turn, mounted on and extends between the legs 50, 51 of a U-shaped adjusting lever 52. The legs 50, 51 lie adjacent to and are pivotally connected at their free ends to the sidewalls 16, 17 by pivot bolts 54, 55. The upper pivot rod 48 is connected to the legs 50, 51 approximately midway between the bight 56 of the lever 52 and the pivot bolts 54, 55.

Spaced from the bight 56 is a cross piece 57 and between the bight and cross piece is a cam 58 which is pivoted on a pin 59 that is secured to the bight 56 and cross piece 57. An internally threaded sleeve 60 is welded to the members 56, 57 and receives a threaded stud 62 which is driven by a crank 63. By turning the crank 63, the cam 58 will rotate about the axis of the pin 59 and be pressed against the top plate 19 of the seat-supporting portion 4 to raise the normal or at rest position of the seat structure 6 and seat-supporting portion 4 relative to the base portion 3. As the seat structure 6 is thus raised, the arms 27, 28 and bar 37 will rotate clockwise from the positions shown in FIG. 1 to those shown in FIG. 5 respectively, and the adjusting lever 52 will pivot about the aligned axes of the pivot bolts 54, 55 and assume the somewhat downwardly inclined position shown in FIG. 5.

The seat structure 6 includes a conventional tubular metal seat frame 65 that supports seat and back cushions 66, 67. The seat frame 65 is bolted or otherwise secured to channels 68, 69 that are adapted to shift along slide channels 71, 72 through rollers 73, whereby the position of the seat frame may be adjusted along the length of the seat supporting portion 3. To lock the seat frame in the selected position of adjustment, latches 74, 74 are pivotally secured at 75, 75 to the channels 68, 69 and have tongues that project through slots 76, 76 in the channels 68, 69 for locking engagement with selected notches 77, 77 (FIG. 4) in one flange of each of the slide channels 71, 72. Springs 78, 78 retain the latches 74, 74 in the selected notches 77, 77, and a handle 79, secured to one of the latches, is used to release the latches. The two latches 74, 74 operate together by reason of the rod 80 that joins the two and is pivotally connected to each.

Welded or otherwise rigidly secured to the seat-supporting portion 4 at the front and rear thereof are four transversely extending parallel sleeves 81, 82, 83, 84 which journal cranks 85, 86, 87, 88. Each pair of axially aligned cranks may be rigidly secured together by small tubes 89, 89 which are pinned to the cranks. The cranks have depending crank arms 90, 91, 92, 93 journaled in bushings 94, 95, 96, 97 which are welded or otherwise rigidly secured to the undersides of the slide channels 71, 72. Thus the seat structure 6 is supported on the portion 4 so as to be free-floating for rocking movement for and aft relative to the seat suspension 2. In the normal or at rest position of the seat structure 6, the cranks will appear as shown, for example, in FIG. 1. Shocks applied fore and aft to the seat structure 6 cause the cranks to move about their axes, turning the crank arms 90, 91, 92, 93 and raising the seat structure. The weight of the seat structure and the weight of the person sitting on the seat tend to return the seat structure to its normal or at rest position. For small shocks the cranks will move through only a small arc while for larger shocks they will move through a greater arc. The greater the arc of movement the greater will be the resistance of the seat structure and load thereon to further rocking movement away from the at rest position. Since no springs or other damping devices tend to resist the shocks, the seat structure is very sensitive to and absorbs relatively light shocks with slight rocking movement.

The seat suspension 2 may, in addition to the spring arrangement 8, incorporate an auxiliary damping device. This may be a conventional automotive type shock absorber 98. One end of the housing or cylinder of the shock absorber 98 may be pivotally secured by a pivot bolt 99 to one of the sidewalls 11 of the base portion 3, while the free end of the piston rod 100 may be pivotally secured by pivot bolt 101 to the adjacent sidewall 17 of the seat-supporting portion 4.

The present invention also provides for adjusting the amount of deflection of the seat structure 6 for a given load thereon so as to give comfortable riding qualities to the seat for persons of different weights. The effective spring lever arm may be considered as the distance between the pivot shaft 21 and the lower cross rod 47. This effective spring lever arm may be changed by moving the lower cross rod 47 so as to place it selectively in any pair of corresponding notches 30, 31, 32 on the the arms 27, 28. For this purpose a lever 102 is pivotally mounted at 103 on the sidewall 10 and rigidly carries with it adjacent to the inside of the sidewall 10 a cam 104 having an inwardly projecting stud 105. In the normal operation of the seat the lever is in the position shown in FIG. 1. The person using the seat can move the lever to the position shown in FIG. 7, causing the stud 105 to engage the arm 27 and urge the entire linkage 7 clockwise to where the seat-supporting position 4 is in its uppermost position. Excessive movement of the lever 102 is arrested by a stop 106 that projects outwardly from the sidewall 10 in the path of movement of lever 102. When the parts are in the positions shown in FIG. 7, the adjusting lever 102 may be grasped and lifted upwardly to pull the lower cross rod 47 out of one corresponding pair of notches 30, 31, 32 on the arms 27, 28 and permit the lower cross rod 47 to be replaced in another corresponding pair of notches. The wires 43 limit the expansion of the springs 39, 40 to permit the lower cross rod 47 to be moved from one set of notches to another when the lever 102 is shifted to the position in FIG. 7.

When the lever 102 is returned to the position of FIG. 1, the forces of the springs 39, 40 maintain the lower cross rod 47 in the selected pair of notches during normal use of the seat. This pressure of the springs 39, 40, therefore, prevents accidental shifting of the lower cross rod 47 from the selected pair of notches to another set when the driver is in the seat and the latter is moving up and down responsive to road shocks.

In compliance with the requirements of the patent statutes we have herein shown and described a preferred embodiment of the present invention. It should be understood, however, that the invention is not limited to the precise construction herein shown, the same being merely illustrative of the principles of the invention. What is new and desired to be secured by Letters Patent is:

1. A seat suspension comprising a base portion and a seat-supporting portion, means including a linkage pivotally secured to each portion and extending therebetween for movably supporting the seat-supporting portion on the base portion, spring means extending between the seat-supporting portion and the linkage, means for pivotally mounting one end of the spring means to the seat-supporting portion, and means, including means for selectively supporting pivotally said other end of the spring means on the linkage in positions intermediate the pivotal connections of the linkage with said two portions, for adjusting the amount of deflection of the seat-supporting portion for a given load thereon, said adjusting means further comprising means for moving one of said portions relative to the other to a position that permits detachment of said other end of the spring means from its pivotal connection so that said other end of the spring means can be moved to another position of pivotal connection.

2. A seat suspension comprising a base portion, means including a linkage pivotally secured to each portion and extending therebetween for movably supporting the seat-supporting portion on the base portion, spring means extending between the seat-supporting portion and the linkage, means for pivotally mounting one end of the spring means to the seat-supporting portion, and means, including means for selectively supporting pivotally said other end of the spring means on the linkage in positions intermediate the pivotal connections of the linkage with said two portions, for adjusting the amount of deflection of the seat-supporting portion for a given load thereon, the support of said other end of the spring means on said linkage in each selected position being maintained during movement of the seat-supporting portion by the force of the spring means, the adjusting means further comprising means for disabling the force of the spring means on the linkage a sufficient amount to permit shifting of the support of said other end of the spring means from one position to another.

3. In combination, a seat suspension comprising a base portion and a seat-supporting portion above the base portion, a linkage secured to each portion and extending therebetween for securing the seat-supporting portion on the base portion for oscillating movement relative thereto, the securement of the linkage to the portions including four pivotal connections, two of which are on one portion and two of which are on the other portion and with the four pivot axes being parallel, spring means extending between the seat-supporting portion and linkage, means pivotally securing the upper end of the spring means to the seat-supporting portion, means connecting the lower end of the spring means to the linkage to form selective pivot supports along the length of the linkage between one of the pivot axes on one portion and one of the pivot axes on the other portion so that the amount of deflection of the seat-supporting portion for a given load thereon will vary in accordance with the selected position of the pivot support along the length of the force of said spring means retaining said pivotal connections associated with the upper and lower ends of the spring means from accidental separation from the linkage and seat-supporting portion upon oscillation of the seat-supporting portion, said seat-supporting portion having spaced crank means mounted for rockable fore and aft movement on the suspension about parallel axes extending transversely thereof, said crank means having depending crank arms, and a seat-mounting carriage journaled on the arms of the crank means for fore and aft rocking without tilting, said fore and aft rocking movement being from an at-rest position wherein the axis of each crank arm and the axis of the associated crank form a vertical plane, and the movement of said seat-mounting carriage tending to return it to the at-rest position being caused substantially entirely by the weight of said carriage and any load thereon.

4. In combination, a seat suspension having a base portion and a seat-supporting portion, means forming a resilient damped connection between the two portions for oscillatory movement of the seat-supporting portion relative to the base portion, a structure including a seat, and means including parallel cranks having crank arms mounting said structure on the seat-supporting portion for rocking fore and aft movement thereon from a normal at rest position such that the movement of said structure away from the normal at-rest position and the movement thereof toward said normal at-rest position is damped only by the friction of the moving parts of the mounting means, thereby to provide a substantially free floating mount for the fore and aft movement of the seat structure in response to shocks thereon, said normal at-rest position being one at which the crank arms are vertical.

5. A seat suspension having a base portion and a seat-supporting portion, means forming a resilient connection between the two portions for oscillatory movement of the seat-supporting portion from a normal at-rest position toward the base portion, and means for adjusting the normal at-rest distance between the two sections; said adjusting means comprising a lever pivotally secured to said means forming the resilient connection and pivotally connected to said seat-supporting portion remote from said last-mentioned pivotal connection, and means interposed between the lever and seat-supporting portion and being carried by one of the two and being urged against the other in opposition to said resilient means when the seat-supporting portion is being raised relative to said base portion.

6. A seat suspension comprising a base portion and a seat-supporting portion above the base portion, a linkage secured to each portion and extending therebetween for securing the seat-supporting portion on the base portion for oscillating movement relative thereto, the securement of the linkage to the portions including four pivotal connections, two of which are on one portion and two of which are on the other portion and with the four pivot axes being parallel, spring means extending between the seat-supporting portion and linkage, lever means pivotally connected to the seat-supporting section, means pivotally connecting the upper end of the spring means to the lever means remote from the pivotal connection of the lever means with the seat-supporting section, and means for raising and lowering the seat-supporting portion relative to the base portion; said last-named means including a cam operatively interposed between the lever means and seat-supporting section and being carried by one of the two and being urged against the other in opposition to the spring means when the seat-supporting portion is being raised.

References Cited by the Examiner

UNITED STATES PATENTS

| | | | |
|---|---|---|---|
| 2,527,905 | 10/1950 | Barecki | 248—421 |
| 2,829,703 | 4/1958 | Knoedler | 248—400 |
| 2,936,818 | 5/1960 | Harrington et al. | 248—399 |
| 3,031,164 | 4/1962 | Schopf | 248—373 |
| 3,075,736 | 1/1963 | Freedman | 248—400 |
| 3,167,295 | 1/1965 | Grumblatt | 248—399 |
| 3,215,386 | 11/1965 | Swenson | 248—400 |

CHANCELLOR E. HARRIS, *Primary Examiner.*

CLAUDE A. LE ROY, *Examiner.*

R. P. SEITTER, *Assistant Examiner.*

UNITED STATES PATENT OFFICE
CERTIFICATE OF CORRECTION

Patent No. 3,319,920                                                   May 16, 1967

Paul Freedman et al.

It is hereby certified that error appears in the above numbered patent requiring correction and that the said Letters Patent should read as corrected below.

Column 5, line 8, after "of", first occurrence, insert -- the linkage --; column 6, line 15, for "therto" read -- thereto --.

Signed and sealed this 21st day of November 1967.

(SEAL)
Attest:

Edward M. Fletcher, Jr.
Attesting Officer

EDWARD J. BRENNER
Commissioner of Patents